Nov. 26, 1968  B. A. WHITEMAN ETAL  3,412,450
STRIP CONDUCTOR COIL MAKING APPARATUS OR THE LIKE
Filed Oct. 18, 1965  9 Sheets-Sheet 1

INVENTORS
BENTON A. WHITEMAN
ROBERT B. LIGHTNER
BY Glenn, Palmer &
Matthews
THEIR ATTORNEYS Nov. 26, 1968  B. A. WHITEMAN ET AL  3,412,450
STRIP CONDUCTOR COIL MAKING APPARATUS OR THE LIKE
Filed Oct. 18, 1965  9 Sheets-Sheet 2

INVENTORS
BENTON A. WHITEMAN
ROBERT B. LIGHTNER
BY

THEIR ATTORNEYS

Nov. 26, 1968    B. A. WHITEMAN ET AL    3,412,450
STRIP CONDUCTOR COIL MAKING APPARATUS OR THE LIKE
Filed Oct. 18, 1965    9 Sheets-Sheet 3

INVENTOR.
BENTON A. WHITEMAN
ROBERT B. LIGHTNER
BY Glenn, Palmer &
Matthews
THEIR ATTORNEYS

INVENTORS
BENTON A. WHITEMAN
ROBERT B. LIGHTNER

BY

THEIR ATTORNEYS

Nov. 26, 1968    B. A. WHITEMAN ET AL    3,412,450
STRIP CONDUCTOR COIL MAKING APPARATUS OR THE LIKE
Filed Oct. 18, 1965    9 Sheets-Sheet 5

INVENTORS
BENTON A. WHITEMAN
ROBERT B. LIGHTNER
BY
*Glenn, Palmer*
*& Matthews*
THEIR ATTORNEYS

INVENTORS
BENTON A. WHITEMAN
ROBERT B. LIGHTNER

BY

THEIR ATTORNEYS

United States Patent Office 3,412,450
Patented Nov. 26, 1968

3,412,450
STRIP CONDUCTOR COIL MAKING APPARATUS
OR THE LIKE
Benton A. Whiteman, Richmond, and Robert B. Lightner, Henrico County, Va., assignors to Reynolds Metals Company, Richmond, Va., a corporation of Delaware
Filed Oct. 18, 1965, Ser. No. 497,069
24 Claims. (Cl. 29—203)

ABSTRACT OF THE DISCLOSURE

This disclosure relates to an apparatus for winding a strip of conductive material into a plurality of strip conductor coils at a predetermined location in the apparatus while securing two leads in side-by-side relation to the strip of conductive material in advance of the coil making location so that the strip can be separated between the two leads in order that one of the leads will form the outer lead on the coil being wound at the predetermined location and the other lead will form the inner lead on a subsequent coil that will be wound by the apparatus, the apparatus having a movable carriage carrying a pair of movable taping heads so that one of the taping heads can attach a length of tape to one end of the strip of conductive material and tape the same to a core on which the strip will be subsequently drawn and wound into coil form and the other taping head being utilized to secure the outer end of the strip of conductive material onto the coil being formed therefrom.

---

This invention relates to an improved apparatus for making strip conductor coils or the like.

It is well known from the copending patent application, Ser. No. 366,497, filed May 11, 1964, that strip conductor coils can be continuously formed by serially winding strip conductors onto core means in such a manner that the inner end of the strip conductor coil will have a terminal attached thereto and the outer end of the strip conductor coil will have a lead attached thereto.

This invention provides improved features for such apparatus disclosed and claimed in the aforementioned copending patent application.

Accordingly, it is an object of this invention to provide an improved apparatus for making strip conductor coils or the like.

Another object of this invention is to provide improved parts for such an apparatus or the like.

Other objects, uses and advantages of this invention are apparent from a reading of this description which proceeds with reference to the accompanying drawings forming a part thereof and wherein:

While the various features of this invention are hereinafter described and illustrated as being particularly adaptable to provide strip conductor coils or the like, it is to be understood that the various features of this invention can be utilized singly or in any combination thereof to provide means for making other devices as desired.

Therefore, this invention is not to be limited to only the embodiments illustrated in the drawings, because the drawings are merely utilized to illustrate one of the wide variety of uses of this invention.

Figures 1, 2, 7:
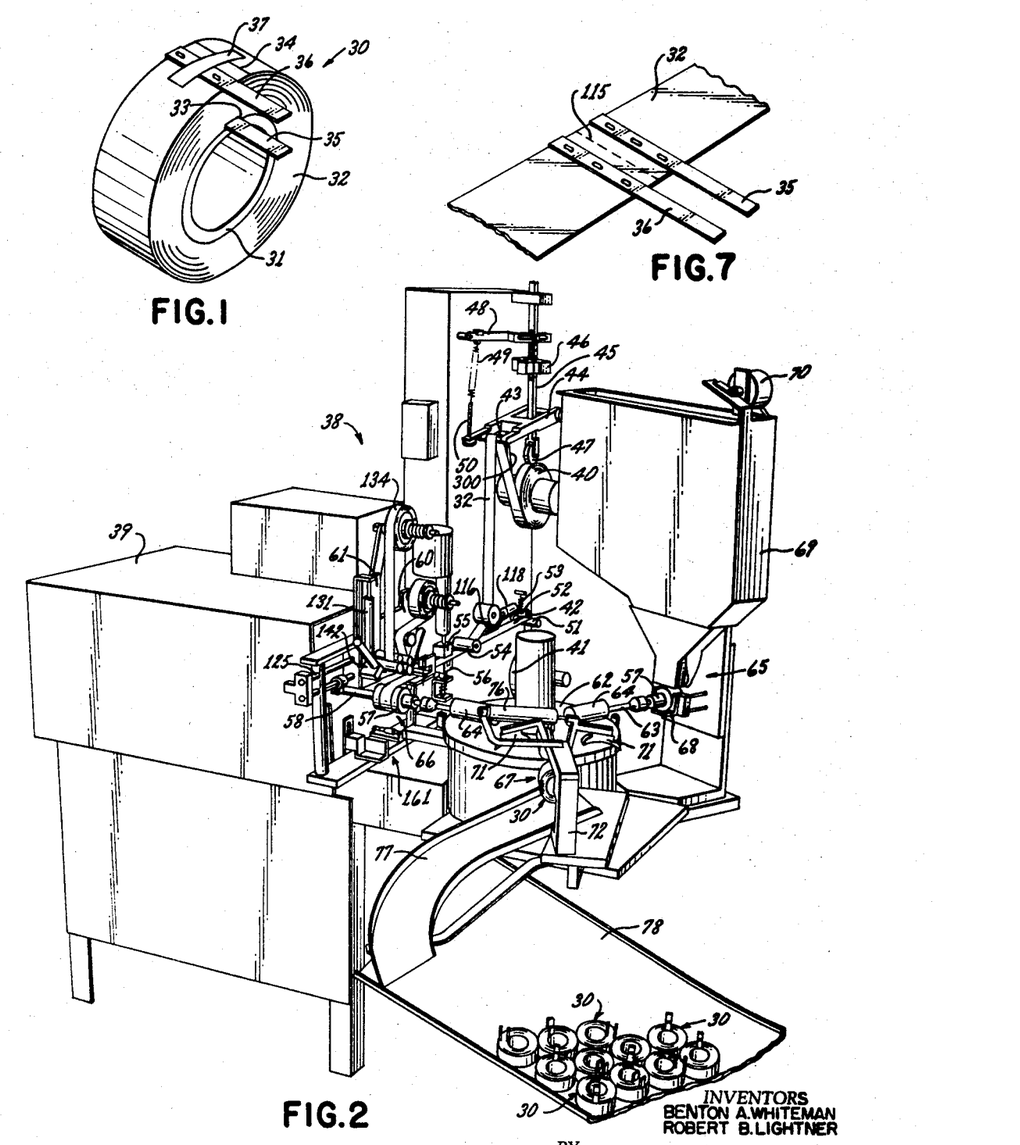
FIGURE 1 is a perspective view of a strip conductor coil formed according to the teachings of this invention.
FIGURE 2 is a perspective view illustrating the improved apparatus of this invention.
FIGURE 7 is a fragmentary perspective view illustrating leads attached in side-by-side relation to a strip conductor.

Referring now to FIGURE 1, an improved strip conductor coil of this invention is generally indicated by the reference numeral 30 and comprises a cylindrical cardboard core 31 or the like having a strip of conductive material 32 wound thereon, the strip conductor 32 having an inner end 33 and an outer end 34. An inner lead 35 is attached to the inner end 33 of the strip conductor 32 in a manner hereinafter described and an outer lead 36 is attached to the outer end 34 of the strip conductor 32 in a manner hereinafter described.

In order to hold the strip conductor 32 in its coiled position on the core 31, suitable pressure sensitive tape means 37 overlaps the end 34 of the strip conductor 32 and the previous turn thereof, the length of the tape means 37 being as small as illustrated in FIGURE 1 or extending completely around the strip conductor coil 30 and being as wide as the strip 32 as desired.

The method and apparatus for continuously making the strip conductor coils 30 is generally indicated by the reference numeral 38 in FIGURE 2 and comprises a frame means 39 rotatably carrying a free wheeling supply roll 40 of strip conductor material 32 as well as a free wheeling supply roll 41 of insulating strip material 42 to be interleaved between adjacent coils of the strip conductor 32 in a manner hereinafter described.

The strip conductor 32 passes from the free wheeling supply roll 40 thereof around a roller 43 carried by a frame means 44 pivotally mounted to the frame 39 by a pivot means 44'. A rod 45 is slidably carried by frame means 46 attached to the frame means 39. The rod 45 has a roller 47 at the lower end thereof resting on the supply roll 40.

An arm 48 is adjustably carried by the rod 45 and is interconnected to the member 44 by a tension spring 49, the arm 48 being pivotally mounted to the frame 39 by pivot means 48'.

The force of the tension spring 49 between the members 44 and 48 can be adjusted by an adjusting screw 50 in a manner well known in the art.

A brake band 300 passes around a roller 301 carrying the supply roll 40 and has one end 302 fixed to the frame means 39 while the other end 303 is fastened to the arm 44.

It is to be understood that the purpose of the braking system for the supply roll 40 is to provide a uniform tension means on the strip 32 as it is fed through the apparatus 38; act as a shock absorbing means, particularly when the apparatus 38 is started; and to overcome the inertia of the rotating roll 40 when the apparatus is stopped.

Figure 3:
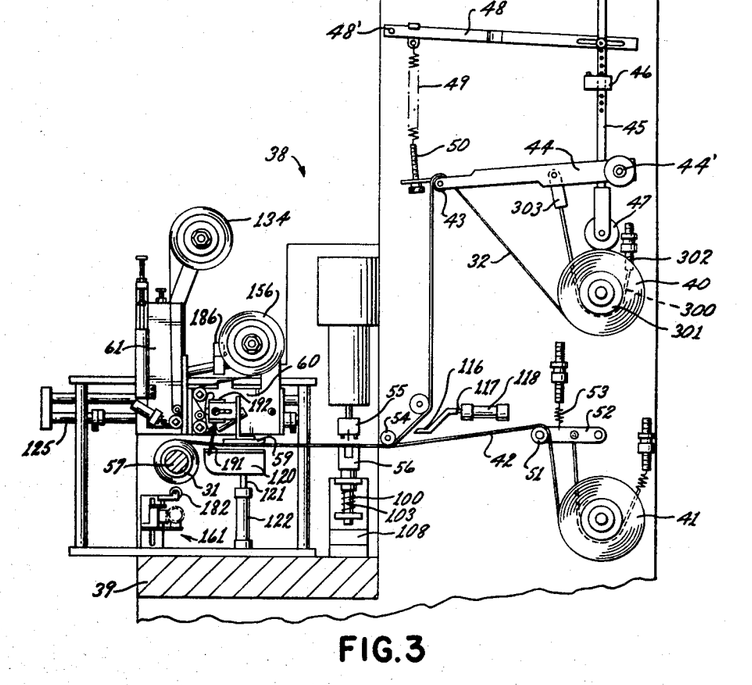
FIGURE 3 is a fragmentary side view of the apparatus illustrated in FIGURE 2.
Figure 29:
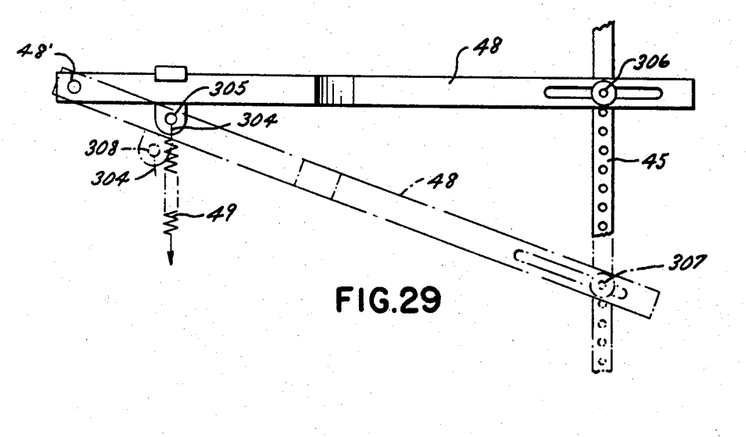
FIGURE 29 is a schematic view of the tensioning means for the apparatus of FIGURE 3.

As illustrated in FIGURES 3 and 29, it can be seen that as the supply roll 40 is being used, less and less spring tension at 49 is needed whereby the tension arrangement of this apparatus is automatically and precisely taken care of by the interaction of the linkage of the structure.

For example, as the supply roll 40 decreases in diameter, the roller 47 carries the member 45 downwardly, and, thus, carries the right end of arm 48 downwardly to lessen the spring tension of spring 49 the correct amount.

In the development of this tension device, it was established empirically that there should be a ratio of approximately 1:10 between the vertical movement of the spring 49 and the member 45.

In particular, see FIGURE 29 wherein the end 304 of the spring 49 is at position 305 when the supply roll 40 is full and a point on the member 45 is at 306. However, as the member 45 moves downwardly during unwinding of the roll 40 so that the point on the member 45 moves to the position 307, the arm 48 pivots in a clockwise direction causing the end 304 of the spring 49 to be at position 308 whereby the movement of the member 45 between points 306 and 307 will be approximately ten times the movement of the end 304 of the spring 49 between the points 305 and 308 when the length of the arm 48 between its pivot 48' and the member 45 is approximately 15 inches and the spring 49 is attached to the arm 48 approximately 1.52 inches from the pivot point 48'.

The insulating strip 42 is fed around a roller 51 carried on a lever 52 pivotally mounted to the frame means 39 and urged in a counterclockwise direction in FIGURE 2 by a tension spring 53 whereby the tension spring 53 provides a slack reducing force on the strip 42 as the same is fed thorugh the apparatus 38 along with the strip 32.

The strips 32 and 42 are brought together underneath a roller 54 carried by the apparatus 38 and are passed between upper and lower members 55 and 56 of a lead attaching apparatus in a manner hereinafter described to be wound on a core 31 being carried on a mandrel 57 and rotated by a drive shaft 58 in a manner hereinafter described.

The strips 32 and 42 pass under a guide means 59 before the same reach the core 31 in the manner illustrated in FIGURES 2 and 3 as well as under taping heads 60 and 61 utilized in a manner hereinafter described.

Figure 4:
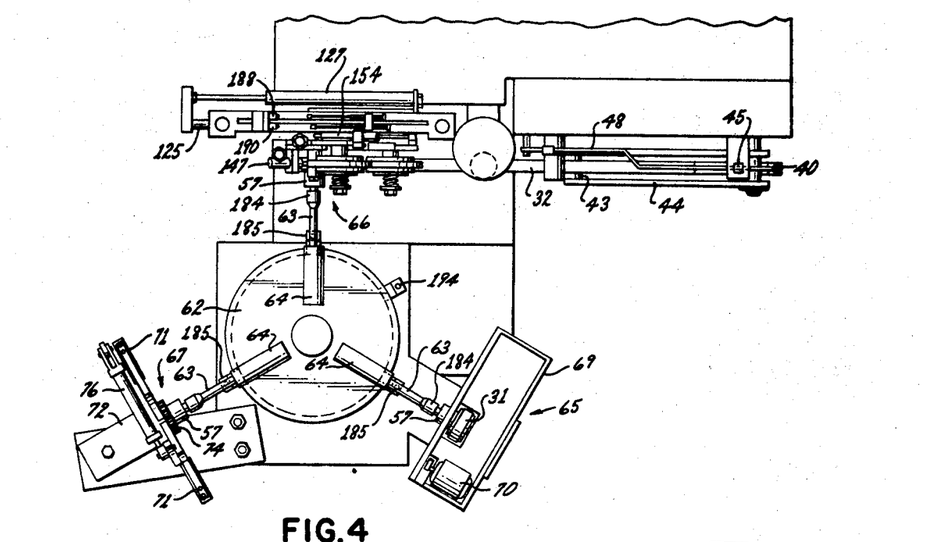
FIGURE 4 is a fragmentary top view of the apparatus illustrated in FIGURE 2.
Figure 5:
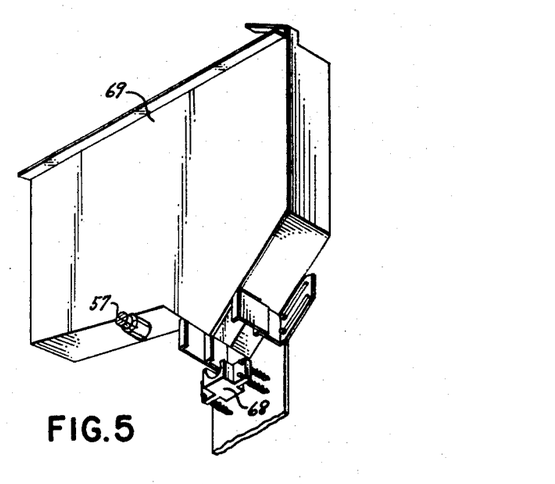
FIGURE 5 is a fragmentary perspective view of the core hopper of the apparatus of FIGURE 2.

As illustrated in FIGURES 2 and 4, a rotatable table 62 is carried by the frame means 39 and has three mandrels 57 operatively carried by piston rods 63 retracted and extended by pneumatic or hydraulic cylinders 64 fixed to the table 62.

The table 62 is adapted to index the mandrels 57 through three stations 65, 66 and 67 in the manner illustrated in FIGURE 4. When a mandrel 57 is at the station 65, the piston rod 63 thereof is adapted to be extended to project the mandrel 57 thereof into a retainer 68 of a hopper 69 to be received within a core 31 serially located in the retainer 68, the hopper 69 containing a plurality of cores 31 in the interior thereof which are adapted to be serially dropped into the retainer 68 by means of a vibrator 70 which shakes the hopper 69 so that a core 31 is always in the retainer 68 thereof.

When the mandrel 57 at the station 65 has a core 31 thereon, the piston rod 63 is retracted so that the core 31 is carried by the mandrel 57 out of the hopper 68 whereby the retracted mandrel 57 can be indexed from the station 65 to the station 66. With the core carrying mandrel 57 now at the station 66, the piston rod 63 thereof is extended to interconnect the mandrel 57 by clutch means to the drive shaft 58 so that when the drive shaft 58 is rotated, the same rotates the mandrel 57 at the station 66 to cause the strips 32 and 42 to be wound on the core 31 carried by the rotating mandrel 57 in a manner hereinafter described.

After a completed strip conductor coil 30 of FIGURE 1 has been formed on the mandrel 57 at the station 66 in a manner hereinafter described, the piston rod 63 is retracted to disconnect the mandrel 57 from the drive shaft 58 whereby the retracted mandrel 57 is adapted to be indexed from the station 66 to the station 67 in the manner illustrated in FIGURES 4 and 6.

With the completed strip conductor coil 30 on the mandrel 57 is at the station 67, the piston rod 63 is extended whereby the strip conductor coil 30 is held in a position at the station 67 so that stripping members 71 can strip the finished strip conductor coil 30 from the mandrel 57.

Figure 6:
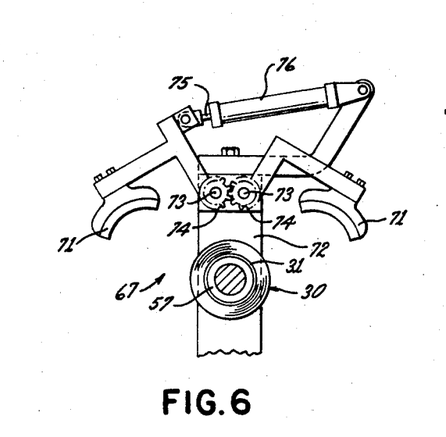
FIGURE 6 is a fragmentary view illustrating the strip conductor take off means of the apparatus of FIGURE 2.

In particular, the stripping members 71, FIGURE 6, are pivotally mounted to a brace 72 by pivot pins 73 respectively carrying pinion gears 74 disposed in meshing relation with each other. The left hand stripping member 71 is interconnected to a piston rod 75 adapted to be extended and retracted by a pneumatic or hydraulic cylinder 76 carried by the brace means 72.

Thus, with a completed strip conductor coil 30 being held at the station 67 by an extended mandrel 57, operation of the cylinder 76 to pivot the left hand stripping member 71 in a counterclockwise direction in FIGURE 6 causes clockwise pivoting of the right hand stripping member 71 because of the meshing gears 74 whereby the stripping members 71 are adapted to engage the strip conductor coil 30 and firmly hold the same between the members 71.

With the strip conductor coil 30 now firmly held between the stripping members 71, retraction of the piston rod 63 of the mandrel 57 at the station 67 pulls the mandrel 57 from the core 31 of the completed strip conductor coil 30 so that the particular mandrel 57 can be subsequently indexed to the station 65. However, with the mandrel 57 at the station 67 now retracted and released from the core 31 of the strip conductor coil 30, the cylinder 76 can be deactuated to return the stripping members 71 to the position illustrated in FIGURE 6 whereby the same drop the completed strip conductor coil 30 onto a chute means 77 illustrated in FIGURE 2 whereby the completed strip conductor coil 30 rolls down the chute 77 to a table 78 for subsequent testing, packaging and the like of the completed strip conductor coils 30 produced by the apparatus 38.

During the coil winding operation on the mandrel 57 at the station 66 in the manner hereinafter described, the drive shaft 58 is momentarily stopped so that the members or die blocks 55 and 56 can cold weld the leads 35 and 36 in side-by-side relation to the conductive strip 32 so that the lead 36 will form the outer lead on the core 31 at the station 67 while the lead 35 will form the inner lead on a new core 31 to be positioned at the station 66 in a manner hereinafter described.

For example, reference is now made to FIGURES 8–15 wherein the frame structure 39 has a frame means 79 for supporting two strips of lead material 80 disposed in side-by-side relation in the manner illustrated in FIGURE 15, the strips of lead material 80 being held against the frame means 79 by an upper frame means 81 cut away at 82 to permit a lead feeding mechanism 83 to operate in the manner hereinafter described.

The lead feeding structure 83 is adapted to feed the strips of lead material 80 from the position illustrated in FIGURE 8 to the position illustrated in FIGURE 10 whereby the lead material 80 projects beyond the strip to conductive material 32 a predetermined distance to form the leads 35 and 36 when the projecting portions of the lead material 80 are severed in the manner hereinafter described, the lead material 80 being fed outwardly to the right in FIGURES 8–10 between the separated die blocks 55 and 56.

The lead materials 80 are respectively adapted to be fed from supply rolls thereof along the frame structure 79 by the pusher means 83.

Figure 8:
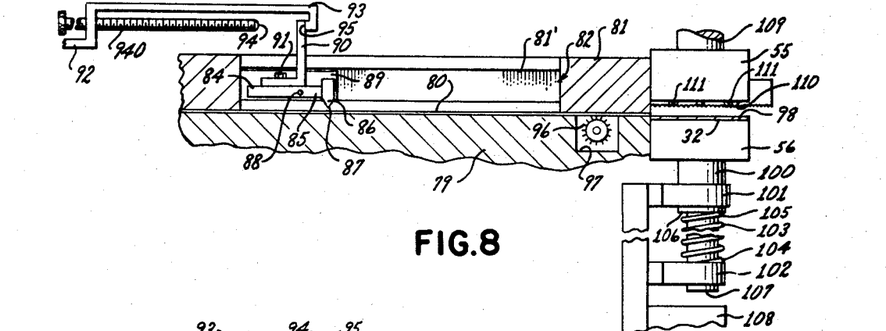
FIGURE 8 is a fragmentary cross-sectional view illustrating the method and apparatus for attaching the leads of FIGURE 7 to the strip conductor of FIGURE 7.
Figure 15:
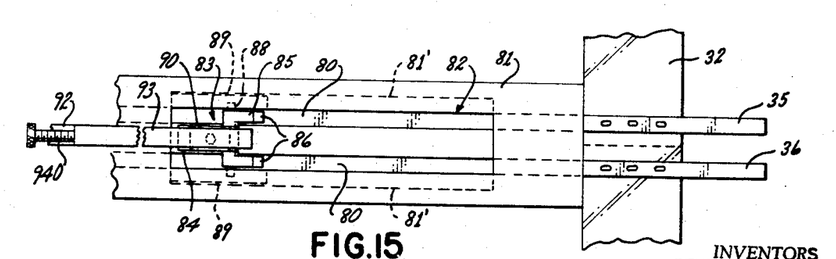
FIGURE 15 is a fragmentary top view of the structure illustrated in FIGURE 8.

In particular, the pusher 83 comprises an elongated portion 84, FIGURES 8 and 15, having a yoke shaped end 85 provided with a pair of downwardly extending pushing members 86 respectively having lead engaging pointed ends 87 in the manner illustrated in FIGURE 8. The elongated portion 84 of the pusher 83 has outwardly pivot means 88 extending therefrom and interconnected to slide means 89 that is free to move in a slot 81' in the frame means 81. The slide means 89 has an adjustable drag (not shown) which allows a means for increasing or decreasing the pressure of the points 87 on the lead material 80.

An adjustable L-shaped member 90 is carried by the elongated portion 84 of the pusher 83 and can be adjusted relative thereto upon loosening of the fastening means 91.

An arm 92 is carried by the apparatus 38 and is adapted to be moved to the right and to the left by a suitable hydraulic or pneumatic piston and cylinder arrangement or by mechanical ram means, if desired.

The arm 92 has a yoke shaped portion 93 adapted to surround the L-shaped member 90 of the pusher 83 in the manner illustrated in FIGURE 8, the arm carrying an adjusting member 940 having an end 94 whereby the arm 92 has spaced surfaces 94 and 95 for respectively engaging the L-shaped member 90 of the pusher 83 in a manner now to be described.

When it is desired to feed the lead material 80 outwardly between the die blocks 55 and 56 to form the leads 35 and 36 in a manner hereinafter described, the arm 92 is moved to the right from the position illustrated in FIGURE 8 until the surface 94 of the adjusting member 940 engages the L-shaped member 90 of the pusher 83 and causes the pusher 83 to tend to rotate in a clockwise direction about the pivot means 88 thereof in the manner illustrated in FIGURE 9 whereby the tips 87 of the pushing members 86 respectively engage the strips of lead material 80.

Figure 9:
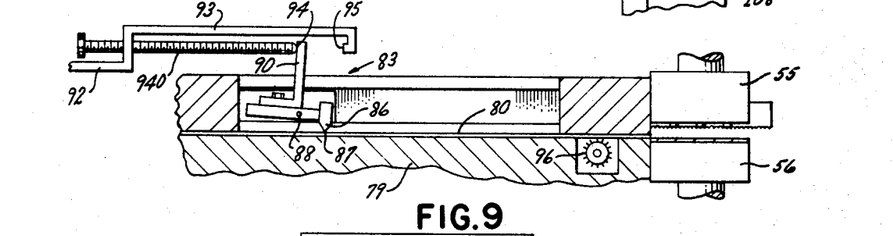
FIGURES 9–13 are views similar to FIGURE 8 and illustrate the apparatus in various operating positions thereof.
Figure 10:
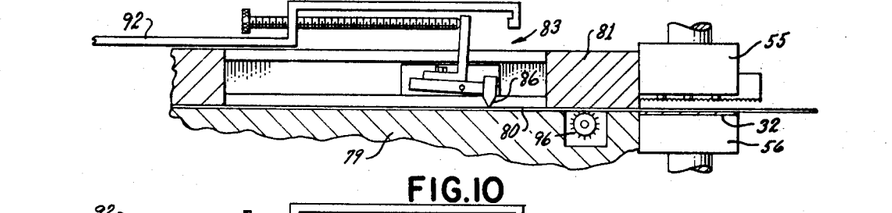

Further movement of the arm 92 from the position illustrated in FIGURE 9 to the position illustrated in FIGURE 10 causes the pushing members 86 to push the strips of lead material 80 to the right in unison therewith whereby the lead material 80 is pushed beyond the frame structure 79 and 81 and out between the die members 55 and 56 until the rightward movement of the arm 92 ceases.

At the same time that the arm 92 moves from the position illustrated in FIGURE 8 to the position illustrated in FIGURE 10, a wire brush 96, rotatably mounted in a cutout 97 of the frame means 79, is rotated to brush the under surfaces of the lead material 80 being advanced by the pusher 83 to facilitate the cold welding characteristics thereof.

However, when the arm 92 is moved from the position illustrated in FIGURE 10 back to the position illustrated in FIGURE 8, the rotation of the wire brush 96 can be terminated.

As the arm 92 moves back to the left, it can be seen that the surface 95 thereof eventually comes into contact with the L-shaped member 90 of the pusher 83 to cause counterclockwise rotation thereof whereby the ends 87 of the pushing members 86 are raised out of contact with the lead material 80 so that the same will not tend to move the lead material 80 to the left therewith.

Figure 13:
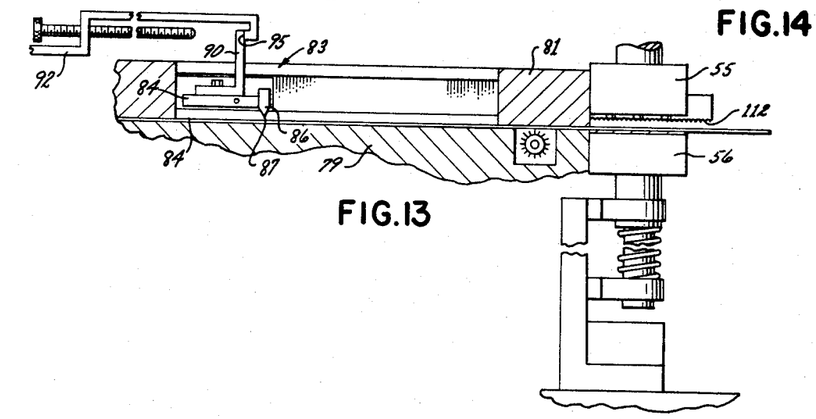

It can be seen that the arm 92 can return the pusher 83 back to the position illustrated in FIGURE 8 in the manner illustrated in FIGURE 13 to permit the same to advance the lead material 80 in the manner previously described at a subsequent time.

Further, it can be seen that by adjusting the member 940 relative to the arm 92, the desired quantity of lead material 80 pushed beyond the right hand ends of the frame members 79 and 81 can be adjusted to provide leads 35 and 36 of any desired lengths within certain limits.

Figure 30:
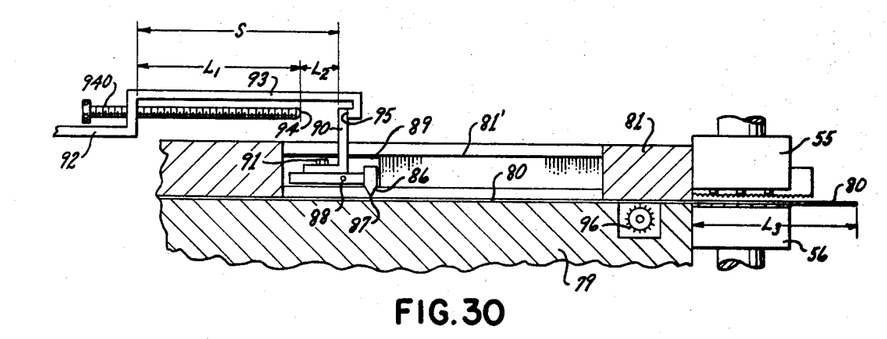
FIGURE 30 is a fragmentary view similar to FIGURE 8 illustrating the means for adjusting the lead feeding mechanism.

For example, reference is made to FIGURE 30 wherein the distance S is equal to the total length of the piston stroke which actuates arm 92. Distance $L_3$ represents the length of lead material 80 fed by the apparatus 38.

It can be seen that $L_1+L_2=S$, that $L_1=L_3$, that $L_3=S-L_2$, that $L_2=S-L_1$ whereby, for example, if leads 35 and 36 having lengths of 2 inches are required, then screw 940 is adjusted so that $L_1$ equals 2 inches.

Thus, if screw 940 is adjusted to the left so that the distance between the end 94 of screw 940 and the part 95 of arm 92 is approximately 5 inches with the distance S being approximately 5 inches, no lead material will be fed for $L_3$ would equal zero. Conversely, if screw 940 is adjusted to the right so that distance $L_2$ disappears, then $L_3$ would equal 5 inches which would be the maximum stroke in this example.

Alternately, the stroke of the piston means operating the arm 92 could be so constructed and arranged that when the distance between the end 94 of the screw 940 and the part 95 of the arm 92 is equal to S, the full stroke of the arm would merely push out the lead material 80 a distance equal to the width of the conductive strip 32 whereby the resulting leads 35 and 36 would not extend beyond the right edge of the strip 32. Thus, by adjusting the screw 940 to the right a particular distance $L_1$, the resulting leads 35 and 36 would extend a distance $L_3$ beyond the right edge of the strip 32 where the distance $L_3$ would be measured from the right edge of strip 32 to the right ends of leads 35 and 36 rather than from the left edge of strip 32 as illustrated in FIGURE 30 whereby the distance $L_3$ would still equal $L_1$.

After the lead material 80 has been advanced to the right by the pusher 83 in the manner previously described, the die blocks 55 and 56 cooperate together to secure the lead material 80 to the strip of conductive material 32.

In particular, the die block 56 has a substantially flat upper surface 98 formed of metallic material or the like, the upper surface 98 of the die block 56 being medially interrupted and having a rubber insert 99 disposed therein for a purpose hereinafter described.

The die block 56 is carried on a shaft 100 movably mounted in a pair of brackets 101 and 102 secured to the frame structure 39 of the apparatus 38.

A compression spring 103 has one end 104 disposed against the lower bracket 102. The other end 105 is disposed against a shoulder 106 of the shaft 100 whereby the compression spring 103 continually urges the die block 56 to the position illustrated in FIGURE 14.

However, when the die block 56 is moved downwardly in the manner hereinafter described, downward movement of the die block 56 in opposition to the compression spring 103 is terminated when the end 107 of the shaft 100 engages a stationary block 108 in the manner illustrated in FIGURE 12.

The upper die block 55 is carried by a shaft 109 movable upwardly and downwardly by a suitable ram means operated pneumatically, hydraulically, or mechanically, as desired.

Figure 14:
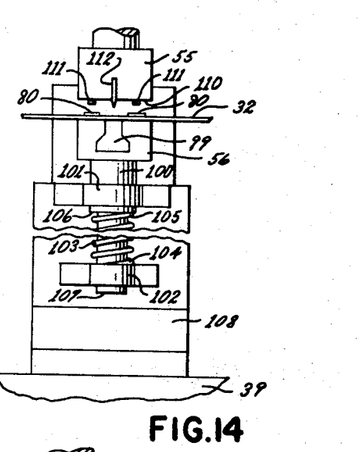
FIGURE 14 is a fragmentary end view of the structure illustrated in FIGURE 8.

The upper die block 55 has a lower surface 110 provided with a plurality of projections 111 adapted to be disposed directly over the lead material 80 in the manner illustrated in FIGURE 14.

The upper die block 55 carries a perforating member 112 which projects beyond the surface 110 thereof and is located directly above the resilient member 99 of the lower die block 56 for a purpose hereinafter described.

Figure 11:
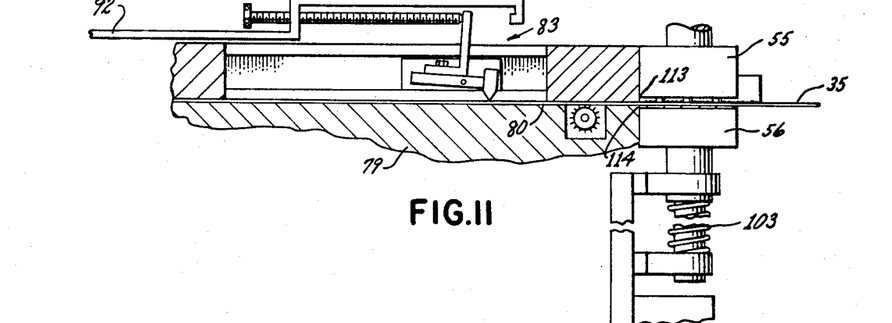
Figure 12:
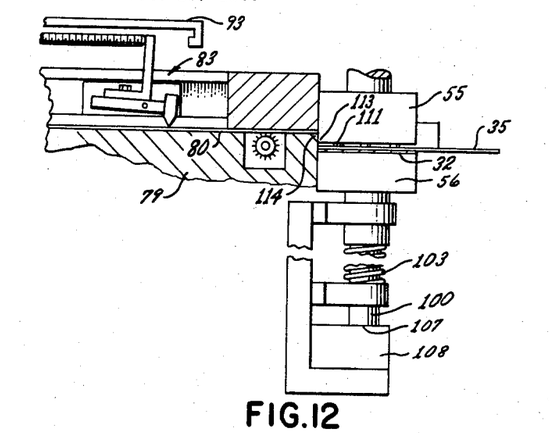

After the lead material 80 has been advanced to the right beyond the frame members 79 and 81 by the pusher 83 in the manner illustrated in FIGURE 10, the upper die block 55 is moved vertically downwardly in the manner illustrated in FIGURE 11 whereby it can be seen that the rear edge 113 of the upper die block 55 cooperates with the upper right hand corner 114 of the frame member 79 to cause shearing of the leads 35 and 36 from the lead material 80 in the manner illustrated in FIGURE 12, such downward movement of the upper die block 55 during the severing operation causing the lower die block 56 to move therewith in opposition to the force of the compression spring 103.

However, when the lower die block 56 bottoms out by having the end 107 of the shaft 100 thereof abut the stationary block 108 in the manner illustrated in FIGURE 12, further movement of the upper die block 55 downwardly causes the projections 111 thereof to cold weld the leads 35 and 36 to the strip of conductive material 32 in the manner illustrated in FIGURE 7. Simultaneously with the cold welding of the leads 35 and 36 to the strip of conductive material 32, the perforating member 112 punches through the strips of material 32 and 42 intermediate the leads 35 and 36 and is received in the resilient member 99 of the lower die member 56 whereby a perforated tear line 115, FIGURE 7, is formed in the superimposed strips of material 32 and 42 to render the strips of material 32 and 42 separatable between the leads 35 and 36 for a purpose hereinafter described.

Thus, it can be seen that the die members 55 and 56 effectively secure the leads 35 and 36 to the strips of conductive material 32 after the die member 55 has separated the leads 35 and 36 from the strips of lead material 80 while at the same time perforate the strips of material 32 and 42 intermediate the leads 35 and 36.

In order to insure that the strip of insulating material 42 will remain in superimposed relation with the strip of conductive material 32 after the strips 32 and 42 have been separated at the separation line 115 in a manner hereinafter described, an adhesive applicator 116 is provided in FIGURES 2 and 3 and is carried on a piston rod 117 which is extended and returned by hydraulic or pneumatic cylinder 118 carried by the frame means 39. Thus, it can be seen that just before the die blocks 55 and 56 are to weld the leads 35 and 36 to the strip of conductive material 32 in the manner previously described, the cylinder 118 is actuated to apply adhesive to the under surface of the strips of conductive material 32 intermediate the roll 54 and a guide roller 119 so that the applied adhesive will secure the insulating strip 42 to the conductive material 32 for a length thereof which is adapted to be subsequently disposed between the die blocks 55 and 56 whereby the insulating material 42 will be firmly secured to the ends 33 and 34 of the conductive strip 32 when the conductive strip 32 and insulating strip are separated at the separating line 115 in the manner hereinafter described.

After the leads 35 and 36 have been secured to the strip of conductive material 32 by the die blocks 55 and 56 in the manner previously described, the die block 55 is raised upwardly back to the position illustrated in FIGURE 13 whereby the strips of material 32 and 42 can be advanced in unison through the apparatus 38.

Figure 21:
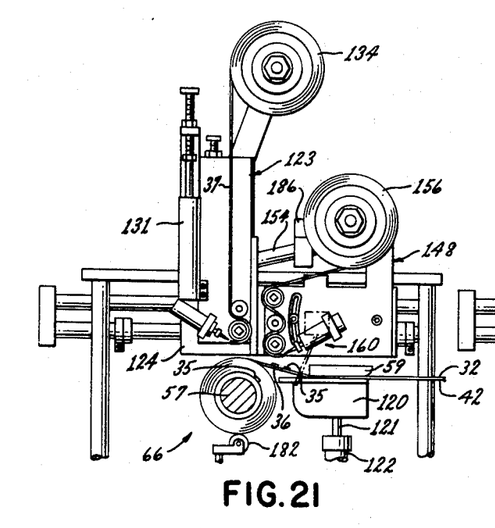

When the leads 35 and 36 reach the position illustrated in FIGURE 21, a lower table 120 carried on a piston rod 121, extended and retracted by a pneumatic or hydraulic cylinder 122 carried by the frame means 39, is raised upwardly in the manner illustrated in FIGURE 21 to compact the strips of material 32 and 42 against the guide 59.

Figure 22:
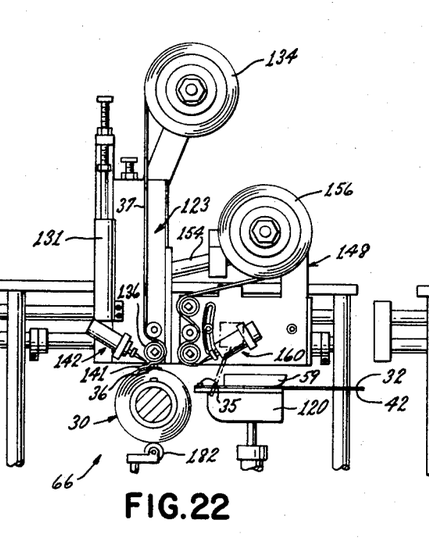

With the strips of material 32 and 42 now being sandwiched between the guide 59 and the table 120, further rotation of the drive shaft 58 to continue to wind the coil 30 on the mandrel 57 at the station 66 causes the strips of material 32 and 42 to separate at the separation line 115 whereby the lead 35 remains at the table 120 while the lead 36 is wound onto the coil 30 in the manner illustrated in FIGURE 22.

Figure 23:
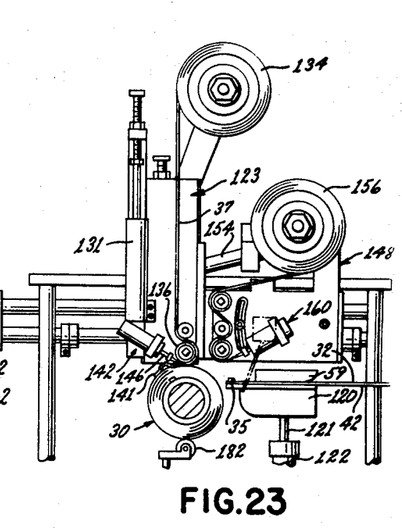
Figure 24:
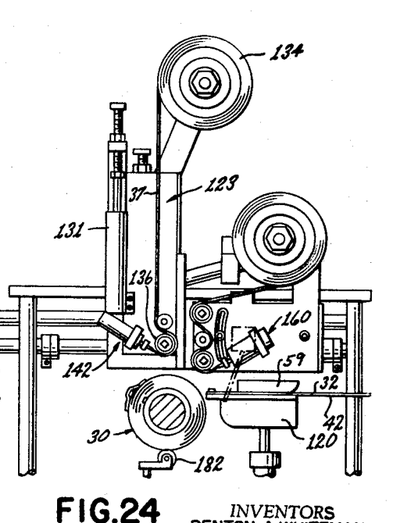

In order to fasten the end 34 of the strip of conductive material 32 and its associated insulating material 42 to the coil 30, the tape 37 is applied to the coil 30 on the mandrel 57 at the station 66 by a taping head means 123 in the manner illustrated in FIGURES 22-24.

Figure 16:
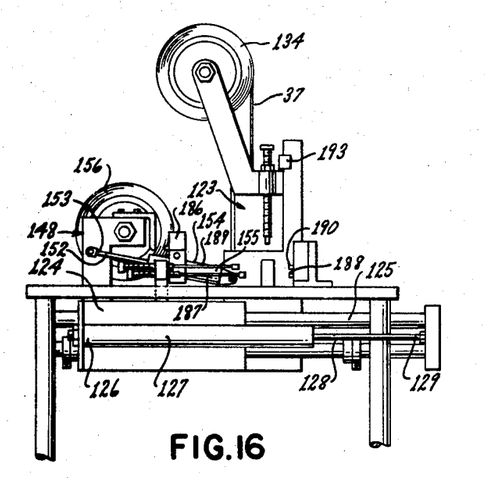
FIGURE 16 is a fragmentary rear view of the taping apparatus of the apparatus of FIGURE 2.
Figure 17:
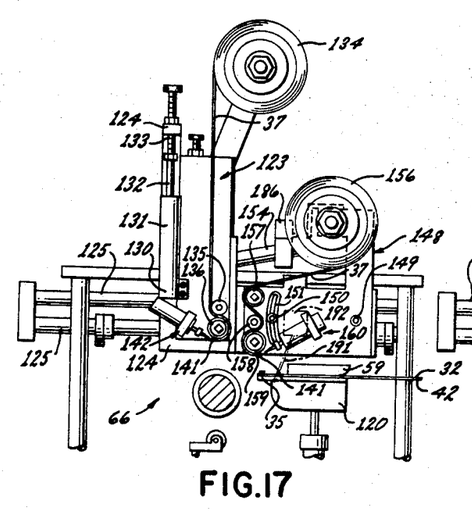
FIGURE 17 is a front view of the taping apparatus of FIGURE 16.

In particular, the taping head means 123 is best illustrated in FIGURES 16 tnd 17 and is movably carried for vertical movement on a frame means 124, the frame means 124 being in turn horizontally movable on horizontal rods 125 carried by the frame means 39 of the apparatus 38.

In particular, the frame means 124 is fastened to an end 126 of a pneumatic or hydraulic cylinder 127 which operates a piston rod 128 having the end 129 thereof interconnected to the stationary rods 125. Thus, when the cylinder 127 is actuated in a manner to tend to retract the piston rod 128, the frame means 124 moves from the position illustrated in FIGURE 17 to the position illustrated in FIGURE 19. Conversely, when the cylinder 127 is actuated to extend the rod 128, the frame means 124 is moved from the position illustrated in FIGURE 19 back to the position illustrated in FIGURE 17.

As previously set forth, the taping head means 123 is mounted for vertical movement relative to the frame means 124. In particular, one end 130 of a pneumatic or hydraulic cylinder 131 is fastened to the taping head means 123 and has the piston rod 132 thereof interconnected to the frame means 124 at the end 133 of the piston rod 132.

Thus, when the cylinder 131 is actuated to extend the piston rod 132, the cylinder 131 moves the taping head means 123 downwardly from the position illustrated in FIGURE 17 to the position illustrated in FIGURE 23, and conversely, when the cylinder 131 is actuated to retract the piston rod 132, the cylinder 131 moves the taping head means 123 from the position illustrated in FIGURE 23 back to the position illustrated in FIGURE 17.

A supply roll 134 of pressure sensitive tape means 37 is carried by the taping head means 123 with the tape 137 extending down partially around a roller 135 carried by the taping head means 123 and partially around a tape applying roll 136.

Figure 25:
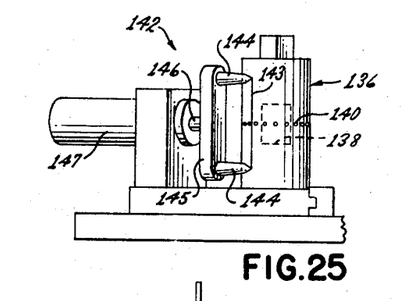
FIGURE 25 is an enlarged, fragmentary view illustrating the tape cutting means of this invention.
Figure 26:
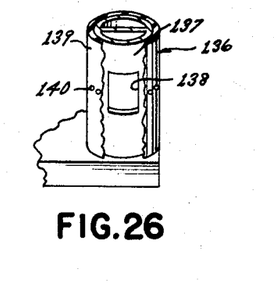
FIGURE 26 is a fragmentary partially broken away view illustrating the tape applying means of this invention.

The tape applying roll 136 is best illustrated in FIGURES 25 and 26 and comprises a fixed hollow tubular member 137 having a cut out 138 in the lower side thereof with the interior of the member 137 adapted to be interconnected to a vacuum source. A sleeve of resilient material 139 is rotatably carried by the tube 137 and has a row of perforations 140 disposed completely around the same with the perforations 140 adapted to register with the cut out 138.

Thus, as the end 141 of the tape 37 of the taping head means 123 extends around the roller 136, the end 141 is held to the roller 136 by means of the vacuum imposed through the perforations 140 of the sleeve 139 in register with the cut out 138 in the tube 137.

It can be seen in FIGURE 22 that when the taping head means 123 is lowered, the roller 136 applies the tape 37 to the strip conductor coil 30 whereby further rotation of the strip conductor coil 30 feeds the tape 37 thereon to pull the same from the supply roll 134. When a sufficient amount of tape 37 has been applied to the strip conductor coil 30 to fasten the end 34 of the strip conductor 32 to the preceding coil thereof, in the manner illustrated in FIGURES 1 and 23, cutting means 142 is provided to sever the tape means 37 between the strip conductor coil 30 and the applying roller 136.

The cutting means 142 is best illustrated in FIGURE 25 and comprises a wire 143 carried by terminals 144 attached to a bracket 145 carried by a piston 146 operated by a pneumatic or hydraulic cylinder 147 carried by the frame means 39.

For example, when the cylinder 147 is actuated to extend the piston rod 146, the wire 143 is pushed against the tape means 37 intermediate the strip conductor coil 30 and the applying roller 136 in the manner illustrated in FIGURE 23 whereby the wire 143 severs the tape 37, the wire 143 having an electrical current passed therethrough so that the heat of the wire 143 cuts through the pressure sensitive tape 37.

When the cylinder 147 is actuated to retract the piston rod 146, the wire 143 is moved away from the tape 37 and the end 141 of the tape 37 is again held against the bottom side of the roller 136 by the aforementioned vacuum means.

Another taping head means 148 is carried by the frame means 124, the taping head means 148 being pivotally mounted to the frame means 124 by pivot pin means 149 and being guided for pivotal movement by a guide pin 150 carried by the frame means 124 and projecting through an arcuate slot 151 of the taping head means 148.

A piston rod 152, FIGURE 16, has an end 153 interconnected to the taping head means 148 and is operated by a pneumatic or hydraulic cylinder 154 having the end 155 thereof interconnected to the frame means 124. Thus, when the cylinder 154 is operated to retract the piston rod 152, the taping head means 148 pivots relative to the frame means 124 from the position illustrated in FIGURE 17 to the position illustrated in FIGURE 18 and, conversely, when the cylinder 154 is operated to extend the piston rod 152, the taping head means 148 is pivoted from the position illustrated in FIGURE 18 back to the position illustrated in FIGURE 17.

The taping head means 148 carries a free wheeling supply roll 156 of pressure sensitive tape means 37 which is fed downwardly around rollers 157, 158 and 159 whereby the end 141 of the tape means 37 is held against the under side of the roller means 159 by the aforementioned vacuum means because the roller means 159 is identical to the roller means 136 previously described and illustrated in FIGURES 25 and 26.

In addition, a cutting knife means 160 is carried by the taping head means 148 and is identical to and operates in the same manner as the cutting knife means 142 previously described and illustrated in FIGURE 25.

Figure 18:
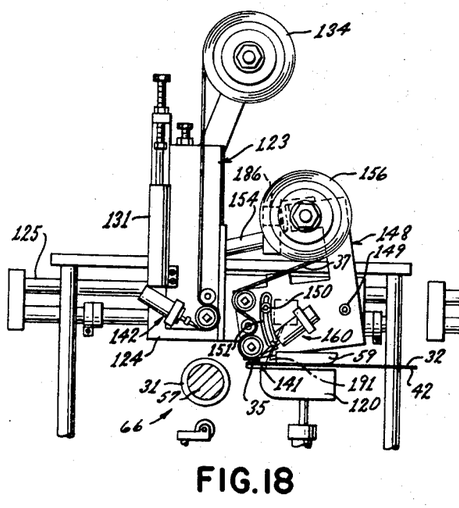

Therefore, it can be seen that when the strips of material 32 and 42 are disposed in the position illustrated in FIGURE 17 and are held between the guide 59 and table 120, downward pivotal movement of the taping head means 148 from the position illustrated in FIGURE 17 to the position illustrated in FIGURE 18 causes the pressure side of the tape 37 to be attached to the lead 35. Thereafter, with the taping head means 148 disposed in the downward pivoted position illustrated in FIGURE 18, the frame means 124 is moved from the position illustrated in FIGURE 18 to the position illustrated in FIGURE 19 whereby the tape 37 is played out from the supply roll 156 to extend from the lead 35 over to the new core 31 positioned at the station 66 by a mandrel 57, the tape 37 being attached to the core 31 by the taping head means 148 whereby the knife means 160 can be operated in the manner illustrated in FIGURE 19 to cut off the played out tape 37 so that the strips of material 32 and 42 are now interconnected to the new core 31 by the severed tape means 37. Thus, the taping head means 148 can be returned to the position illustrated in FIGURE 20 and be moved back to the right to the position illustrated in FIGURE 17 whereby rotation of the mandrel 57 at the station 66 now winds the strips 32 and 42 onto the rotating core 31 after the table 120 has been lowered relative to the guide 59.

Figure 27:
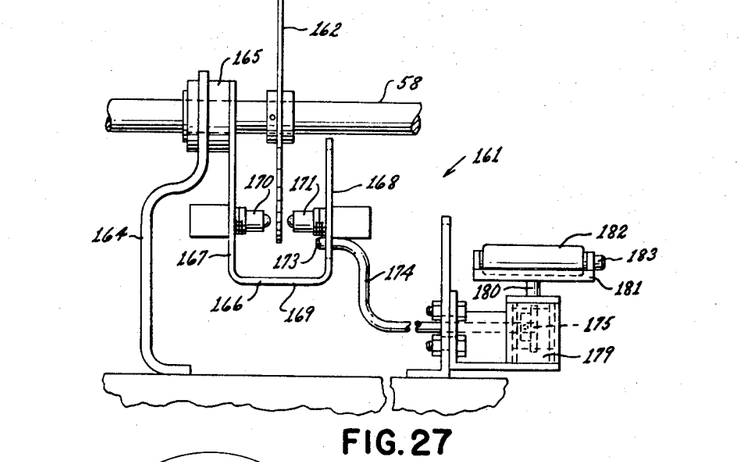
FIGURE 27 is a fragmentary side view illustrating the photo cell arrangement of this invention for counting the number of turns of the strip conductor on the core of this invention.
Figure 28:
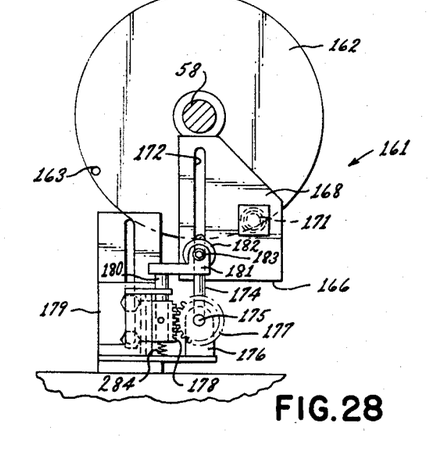
FIGURE 28 is a side view of the apparatus illustrated in FIGURE 27.

In order to insure that a predetermined number of turns of the strips of material 32 and 42 are made on each core 31 and that the inner and outer leads 35 and 36 will be properly oriented relative to each other on the completed strip conductor coil 30, counting and compensating mechanism 161 is provided in FIGURES 27 and 28.

In particular, the drive shaft 58 has a disc 162 fixed thereto with the disc 162 having an aperture 163 passing therethrough. A fixed frame means 164 telescopically receives the shaft 58 and carries a collar 165 also telescopically receiving the shaft 58 and being rotatable relative thereto. The collar 165 carries a U-shaped bracket 166 defined by a pair of legs 167 and 168 interconnected together by a cross member 169, the leg 167 being fixed to the collar 165 which is rotatably carried by the frame means 164.

The leg 167 of the bracket 166 carries a photocell eye 170 adapted to be aligned with the aperture 163 in the disc 162. The other leg 168 of the bracket 166 carries a light source 171 directly opposite the photocell 170 so that each time the disc 162 makes one complete revolution, the aperture 163 is aligned between the light source 171 and the photocell 170 so that the photocell 170 will count one complete revolution of the disc 162 and, thus, one complete revolution of the core means 31 at the station 66.

Thus, as the drive shaft 58 is rotated to rotate the core means 31 the disc 162 causes the photocell 170 to count the number of turns of the material 32 and 42 being wound on the core 31 so that a predetermined number of turns of the strip of material 32 on core 31 can be maintained by the apparatus 38 of this invention.

However, because the thickness of the strip material 32 as well as the thickness of the material 42 may vary throughout the length thereof, the actual length of the strip of material 32 being wound on each core 31 may vary even though the cores 31 have the same number of turns thereon.

Therefore, the mechanism 161 compensates for variations in the thickness of the material 32 and 42 being wound on any particular core 31.

In particular, the leg 168 of the bracket 166 has a longitudinal slot 172 formed therein in the manner illustrated in FIGURE 28 and receives an end 173 of a bent arm 174 having another end 175 thereof rotatably received in a fixed frame means 176, the end 175 of the arm 174 being fixed to a pinion gear 177 disposed in meshing relation with a vertically moving gear rack 178. The gear rack 178 is guided for vertical movement by a stationary frame means 179. The gear rack 178 is interconnected to a shaft 180 which, in turn, is interconnected to a bracket 181 rotatably carrying a roller 182 on a shaft means 183 in the manner illustrated in FIGURES 27 and 28. The rack 178 is urged upwardly to the position illustrated in FIGURE 28 by a compression spring 284.

Thus, it can be seen that the compression spring 284 urges the roller 182 upwardly so that the roller 182 will be engaged by the strip conductor coil 30 being wound at the station 66.

For example, as the strip conductor coil 30 is being wound at the station 66, the coil 30, as the same increases in diameter, eventually engages the roller 182 and pushes downwardly on the same as the thickness increases.

This downward movement of the roller 182 carries the rack 178 therewith to cause turning of the pinion gear 177 in a countercockwise direction in FIGURE 28 and, a clockwise movement of the bracket 166 to reposition the photocell 170 and light source 171 relative to the rotating disc 162 so that any variations in the thickness of the coil being wound will be compensated for so that the photocell 170 will still properly count the number of turns on the core 31. When the proper number of turns have been made, the photocell 170 will cause the rotating shaft 58 to stop and operate the cold welding means 55 and 56 so that the leads 35 and 36 will be so positioned on the strip of conductive material 32 in such a manner that the lead 36 will subsequently be wound onto the core 31 to be properly oriented relative to the inner lead 35 thereof.

The operation of the apparatus 38 of this invention will now be described.

Assuming that the table 120 is closed against the guide means 59 in the manner illustrated in FIGURE 17 with the strip of conductive material 32 having the lead 35 thereon as illustrated in FIGURE 17, the table 62 is indexed to the position illustrated in FIGURE 4 whereby the cylinders 64 are actuated to extend the piston rods 63 because the portions 184 of the piston rods 63 have tripped switches 185 carried by the frame means 39 and located respectively at the stations 65–67. The extension of the piston rods 63 outwardly causes the mandrel 57 at the station 66 to engage the clutch on the drive shaft 58 so that subsequent rotation of the drive shaft 58 will rotate the core carrying mandrel 57 at the station 66. Also, the mandrel 57 at the station 65 is extended into the retainer 68 of the hopper 69 to receive a core 31 thereon and engages a switch (not shown) in the retainer 68 which actuates the cylinder 154. Also the third mandrel 57 at the station 67 is moved into position to be gripped by the gripping members 71 in the manner previously described.

When the switch in the hopper 69 is actuated, the same actuates the cylinder 154 to pivot the taping head 148 from the position illustrated in FIGURE 17 to the position illustrated in FIGURE 18 to apply the end 141 of the tape 37 to the lead 35.

Figure 19:
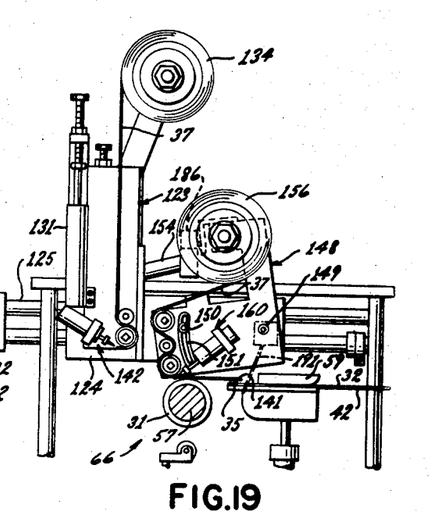
FIGURES 19–24 are respectively views similar to FIGURE 17 illustrating the taping apparatus in the various operating positions thereof.

Pivotal movement of the taping head 148 from the position illustrated in FIGURE 17 to the position illustrated in FIGURE 18 causes the taping head 148 to actuate a switch 186, FIGURE 16, which actuates the cylinder 127 to move the frame means 124 from the position illustrated in FIGURE 18 to the position illustrated in FIGURE 19 whereby the tape 37 extends from the lead 35 onto the core 31. When the frame means 124 moves to the position illustrated in FIGURE 19, a plunger 187 engages a switch 188 which causes the actuator 122 to lower the table 120 to the position illustrated in FIGURE 20.

The switch 188 also actuates the main motor of the apparatus 38 to begin to rotate the drive shaft 58. However, simultaneously a plunger 189 operates a switch 190 which actuates the cutting knife 160 to cut the tape 37 in the manner illustrated in FIGURE 19. The switch 190 also actuates the cylinder 76 to cause the gripping members 71 to grip the coil 30 at the station 67.

Figure 20:
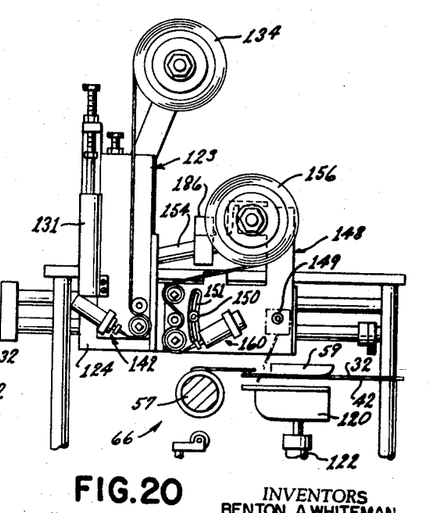

The switch 188 also actuates the cylinder 154 to pivot the taping head means 148 from the position illustrated in FIGURE 19 to the position illustrated in FIGURE 20 whereby the movement of the taping head means 148 releases the switch 186 to cause the cylinder 127 to return the frame means 124 back to the position illustrated in FIGURE 21.

With the main motor now operating, the drive shaft 58 rotates the core carrying mandrel 57 at the station 66 to cause the strips of material 32 and 42 to be wound thereon while the roller 182 and photocell arrangement 170, 171 counts the number of turns on the core 31 until at a proper count the photocell 170 operates a timer which stops rotation of the drive shaft 58 and causes the die blocks 55 and 56 to cold weld the leads 35 and 36 to the strip of conductive material 32 in the manner previously described. After the leads 35 and 36 have been cold welded to the strips of conductive material 32 in the manner previously described, the timer jogs the drive shaft 58 to place the leads between the guide means 59 and lowered table 120 until the lead 36 goes by a switch arm 191 which actuates a switch 192, the switch 192 actuating the cylinder 122 to compress the material 32 and 33 between the table 120 and guide means 59 so that further rotation of the shaft 58 causes the material 32 and 42 to break at the separation point 115 and permit the end 34 of the conductive material 32 as well as the adjacent end of the severed insulating material 42 to be further wound on the core 31.

The timer then actuates the cylinder 131 to move the taping head means 123 downwardly from the position illustrated in FIGURE 21 to the position illustrated in FIGURE 22 to apply the end 141 of the tape 37 to the coil 30. As the coil 30 continues to rotate by movement of rotation of the drive shaft 58, the tape 37 is wrapped therein for the desired amount until the timer causes the cylinder 131 to raise the taping head means 123 while operating the knife means 142 to sever the tape in the manner illustrated in FIGURE 23. The knife 142 cuts off the tape 37 while the coil is rotating whereby the lead positioning roller 182 functions to wipe down the overlapped tape 37 on the core 31.

As the taping head means 123 moves upwardly from the position illustrated in FIGURE 23 to the position illustrated in FIGURE 24, the same trips a one way switch 193, FIGURE 16, which actuates the cylinders 64 on the table 62 to retract the piston rods 63. As the piston rods 63 carry the mandrel 57 inwardly toward the table 62, the portions 184 on the piston rods 163 trip the switches 185 which cause the actuator 76 to move the stripping members 71 outwardly so that the coil 30 being held thereby will drop onto the chute 77. Simultaneously, the hit switches 185 cause the table 62 to rotate, and operate the vibrator 70. As the table 62 rotates, the portion 184 of the piston rod 63 moving between the stations 65 and 66 hits a switch 194 which activates the switches 185 so that when the switches 185 are again actuated by the portions 184 of the pistons 63 being received at their respective stations, the switches 185 will cause the cylinders 64 to extend the piston rods 63.

However, before the table 62 will rotate to reposition the mandrels 57 in the manner previously described, a suitable photo reflective eye arrangement must first sense that a core is on the mandrel 57 at the station 65 and that the table 120 is in its up position.

Therefore, it can be seen that the apparatus 38 of this invention is now in a new position to begin winding another strip conductive coil 30 in the manner previously described.

As previously set forth, it can be seen that the apparatus 38 of this invention is adapted to continuously make strip conductor coils 30 in a unique and novel manner by structures and methods which are greatly improved over the apparatus and method set forth in the aforementioned copending patent application.

While the apparatus 38 of this invention has been described as winding the strip conductor coil 30 with an interleaved insulating strip 42, it is to be understood that the strip conductor coils could be wound without the interleaved strip 42, if desired.

Further, while the various details of the mandrels 57 and their operative interconnection with the drive shaft 58 has been broadly set forth, the specific details thereof can be obtained by reference to the aformentioned copending patent application.

Accordingly, it can be seen that not only does this invention provide an improved apparatus for continuously making strip conductor coils or the like, but also this invention provides an improved parts for making such strip conductor coils or the like.

While the form of the invention now preferred has been disclosed as required by the statutes, other forms may be used, all coming within the scope of the claims which follow.

What is claimed is:

1. Apparatus for continuously making strip conductor coils having inner and outer leads connected thereto comprising means for positioning a core in a predetermined location in said apparatus, said apparatus having a supply roll support carrying a supply roll of strip conductive material, means for coiling a strip of conductive material from said supply roll thereof onto said core while said core is at said predetermined location, means for securing two leads in side by side relation to said strip intermediate said predetermined location and said supply roll support, means for severing said strip between said leads intermediate said predetermined location and said supply roll support whereby one of said leads forms the outer lead on said core and the other lead will form the inner lead on another core, said severing means including a first member positioned on one side of said strip intermediate said predetermined location and said supply roll support, said severing means including a second member movable toward and away from said first member on the other side of said strip whereby said members cooperate together to clamp and hold said strip therebetween and between said supply roll support and said leads as said coiling continues to sever said strip between said leads, means to position said other core at said predetermined location after said first-named core is moved from said predetermined location, and means separate from said severing means to interconnect the portion of said strip having the other lead thereon to said other core at said predetermined location so that another strip conductor coil can be formed on said other core in the above manner.

2. Apparatus as set forth in claim 1 and including means to adhesively secure a non-conductive strip to said conductive strip just at a point where said leads will be secured to said conductive strip so that said non-conductive strip will be secured to the separated parts of said conductive strips after the same is severed between said leads.

3. Apparatus as set forth in claim 1 wherein means are provided to operate said lead securing means so that the inner and outer leads on each core will be positively located relative to each other.

4. Apparatus as set forth in claim 1 wherein said last-named means includes a taping means.

5. Apparatus as set forth in claim 1 and including means for securing the end of said strip having said outer lead to the coil thereof.

6. Apparatus as set forth in claim 5 wherein said last-named means includes a taping head.

7. Apparatus for continuously making strip conductor coils having inner and outer leads connected thereto comprising a supply roll support carried by said apparatus and carrying a supply roll of strip conductive material, means for winding said strip of conductive material from said supply roll thereof onto a core disposed in a predetermined location in said apparatus, means for securing two leads in side by side relation to said strip intermediate said predetermined location and said supply roll support, means for severing said strip between said leads intermediate said predetermined location and said supply roll support whereby one of said leads forms the outer lead on said core and the other lead will form the inner lead on another core, and means for securing a tape to said severed strip at the end thereof having said other lead and attaching said secured tape to said other core at said predetermined location so that another coil can be wound, said last-named means including a pivotally mounted taping head, said apparatus carrying cutting means for cutting said tape between said taping head and said other core, said apparatus carrying an axially movable carriage, said taping head being pivotally mounted to said carriage whereby axial movement of said carriage relative to said apparatus moves said taping head between said end of said severed strip and said predetermined location.

8. Apparatus as set forth in claim 7 wherein said taping head includes a supply roll of said tape and roller means for applying said tape from said roll to said strip and said core.

9. Apparatus as set forth in claim 8 wherein vacuum means holds said tape to said roller means.

10. Apparatus as set forth in claim 7 wherein another movable taping head is carried by said carriage for securing a tape over the severed end of said strip carrying said one lead to secure that end to said coil.

11. Apparatus as set forth in claim 10 wherein cutting means is carried by said apparatus for cutting said tape between said last-named taping head and said coil.

12. Apparatus for continuously making strip conductor coils having inner and outer leads connected thereto comprising a supply roll support carried by said apparatus and carrying a supply roll of strip conductive material, means for winding said strip of conductive material from said supply roll thereof onto a core disposed in a predetermined location in said apparatus, means for securing two leads in side by side relation to said strip intermediate said predetermined location and said supply roll support, means for severing said strip between said leads intermediate said predetermined location and said supply roll support whereby one of said leads forms the outer lead on said core and the other lead will form the inner lead on another core, and means for securing a tape to said severed strip at the end thereof having said other lead and attaching said secured tape to said other core at said predetermined location so that another coil can be wound, said last-named means including a pivotally mounted taping head, said apparatus carrying cutting means for cutting said tape between said taping head and said other core, said apparatus having another movable taping head for securing a tape over the severed end of said strip carrying said one lead to secure that end to said coil, said apparatus carrying a movable carriage, said last-named taping head being movably carried by said carriage whereby said carriage is moved relative to said apparatus to position said last-named taping head adjacent said predetermined location for the taping operation thereof.

13. Apparatus as set forth in claim 12 wherein said first-named taping head is pivotally mounted to said carriage.

14. Apparatus as set forth in claim 10 wherein said last-named taping head includes a supply roll of said tape and roller means for applying said tape from said roll to said coil.

15. Apparatus as set forth in claim 14 wherein vacuum means holds said tape to said roller means.

16. Apparatus for applying tape means comprising frame means, a carriage movably carried by said frame means to move between two spaced positions on said frame means, a first taping head movably carried by said carriage for applying its tape between said two spaced positions, and a second taping head movably carried by said carriage for applying its tape in a particular position of said carriage relative to said frame means.

17. Apparatus as set forth in claim 16 wherein said first taping head is pivotally carried by said carriage.

18. Apparatus as set forth in claim 16 wherein said second taping head is axially movable relative to said carriage.

19. Apparatus as set forth in claim 16 wherein a piston and cylinder arrangement is carried by said frame means and is adapted to move said carriage.

20. Apparatus as set forth in claim 16 wherein a piston and cylinder arrangement is carried by said carriage and is adapted to move said first taping head.

21. Apparatus as set forth in claim 16 wherein a piston and cylinder arrangement is carried by said carriage and is adapted to move said second taping head.

22. Apparatus as set forth in claim 16 wherein at least one of said taping heads includes a supply roll of said tape means and roller means for applying said tape from said roll.

23. Apparatus as set forth in claim 22 wherein vacuum means holds said tape to said roller means.

24. Apparatus as set forth in claim 16 wherein at least one of said taping heads includes a cutting means for cutting the tape means thereof.

(References on following page)

References Cited

UNITED STATES PATENTS

| | | | |
|---|---|---|---|
| 2,333,966 | 11/1943 | Weiss | 242—56.1 X |
| 2,390,174 | 11/1945 | Roemer | 140—112 X |
| 2,610,390 | 9/1952 | Locke | 29—505 |
| 2,710,441 | 6/1955 | Hegman | 242—56.1 X |
| 2,946,727 | 7/1960 | Wellington | 242—56.1 X |
| 3,073,008 | 1/1963 | McGraw | 242—56.1 X |
| 3,133,981 | 5/1964 | Seele | 264—261 |
| 3,226,803 | 1/1966 | Samuels | 29—417 |
| 3,234,063 | 2/1966 | Masini | 29—605 |
| 3,234,628 | 2/1966 | Frekko | 29—25.42 |

JOHN F. CAMPBELL, *Primary Examiner.*

C. E. HALL, *Assistant Examiner.*